United States Patent [19]

Rigg et al.

[11] 4,329,049
[45] May 11, 1982

[54] MEDIAN POINT DETECTING APPARATUS FOR A LENSMETER

[75] Inventors: George P. Rigg, Los Gatos; Tom N. Cornsweet, Menlo Park; J. Kirkwood H. Rough, San Jose; H. Malcolm Ogle, Palo Alto; Wallace R. Prunella, Sunnyvale; Lawrence H. Schiller, Santa Clara, all of Calif.

[73] Assignee: Rodenstock Instruments Corporation, Sunnyvale, Calif.

[21] Appl. No.: 127,797

[22] Filed: Mar. 6, 1980

[51] Int. Cl.$^3$ ............................ G01B 9/00; H01J 40/14
[52] U.S. Cl. ...................................... 356/124; 250/208
[58] Field of Search ..................... 350/124, 124.5, 125, 350/126, 127; 307/311, 234, 351; 250/208, 209

[56] References Cited

U.S. PATENT DOCUMENTS

| | | | |
|---|---|---|---|
| 3,880,525 | 4/1975 | Johnson | 356/127 |
| 3,922,093 | 11/1975 | Dandliker et al. | 356/120 |
| 4,093,866 | 6/1978 | Kasdan et al. | 250/563 |
| 4,145,721 | 3/1979 | Beaudouin et al. | 307/311 |

Primary Examiner—John K. Corbin
Assistant Examiner—Bruce Y. Arnold
Attorney, Agent, or Firm—Phillips, Moore, Weissenberger, Lempio & Majestic

[57] ABSTRACT

A lensmeter is disclosed for determining the refractive properties of a test lens, including an optical system to produce an ellipse of light at a detecting plane having information of such properties, a scanning linear photodiode array at the detecting plane for producing video output signals, a first integrator to integrate the video output signal from each photodiode, a compensator to compensate each video output signal for the light sensitivity of each photodiode, a second integrator to integrate the compensated video signals over the range of the distribution of light of an area of the ellipse being scanned, a circuit, connected to the second integrator, to detect the median point of the distribution, and a microprocessor to provide data identifying the median point in response to the detection.

19 Claims, 6 Drawing Figures

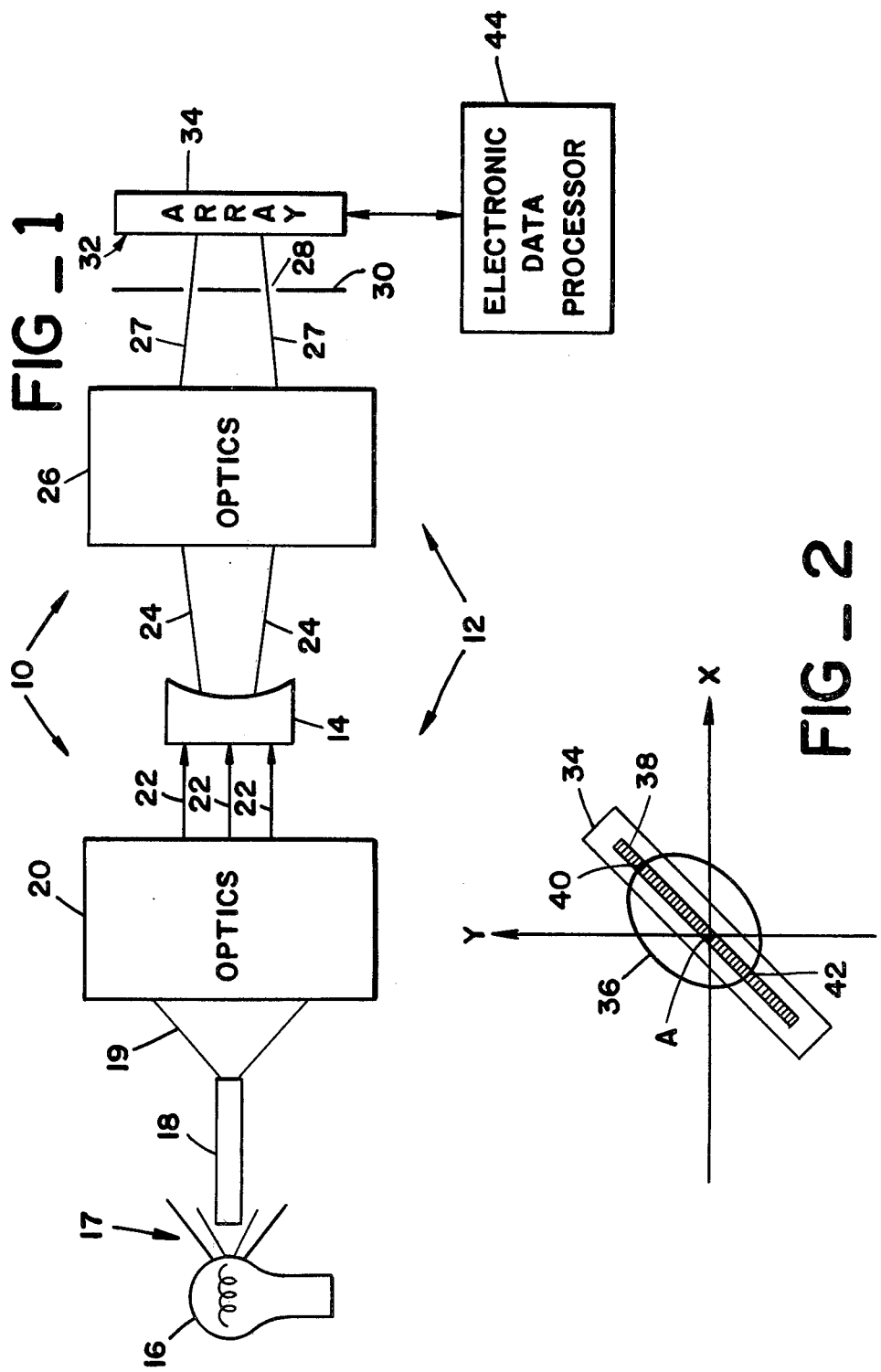

MEDIAN POINT DETECTING APPARATUS FOR A LENSMETER

DESCRIPTION

Technical Field

This invention relates generally to apparatus for determining a point of a light distribution and more particularly to lensmeter apparatus for determining the median point to calculate the refractive properties of a test lens.

Background Art

Ophthalmic and contact lenses are worn to correct the vision of a large number of people. Thus, annually, millions of lenses, either newly manufactured or old, must be accurately measured to ensure that the intended correction to the vision of the lenswearer is satisfactory. To meet this requirement, apparatus known as lensmeters have been developed to calculate the refractive properties of these lenses.

In recent years, automatic lensmeters have been developed which include an optical system to transmit light through the lens being tested and a computerized electronic data processor that detects the light refracted by the test lens and that calculates the refractive properties of the lens. U.S. Pat. application Ser. No. 085,864, (now abandoned) filed Oct. 18, 1979, by Arthur Vassiliadis et al., and assigned to the assignee of the present invention, discloses an automatic lensmeter. The optical system of this lensmeter produces an ellipse of light at a detecting plane, in which the ellipse has a shape, size and offset from the optical axis of the lensmeter depending on the refractive properties of the test lens. A scanning linear photodiode array at the detecting plane senses the light of the ellipse, and the data processor calculates the refractive properties of the test lens in response to video output signals from the array.

In the lensmeter of the above-mentioned patent application, the linear photodiode array normally will intersect two areas of the ellipse at which there are distributions of light. As the array is scanning, the video output signal of each photodiode increases from the diode at the edge of the light distribution towards a maximum at the center of this distribution and then decreases towards the outer edge of the distribution. The data processor develops a pair of waveforms from the video output signals, each representing one of the light distributions.

The data processor of the lensmeter of the prior patent application uses a differentiator to detect the peak of each waveform for purposes of obtaining data to calculate the refractive properties of the test lens. This peak is assumed to correspond to the point of maximum intensity of the light distribution. Essentially, the differentiator is designed to differentiate the waveform such that the peak is detected when the slope of the waveform changes at the maximum rate at the center of the waveform. A disadvantage with this differentiation technique is that false peaks can be detected. For example, for a variety of reasons the amplitudes of the developed waveform corresponding to two adjacent photodiodes may be different even though the amount of light falling on these diodes is the same. If the amplitude corresponding to the second diode is less than the amplitude corresponding to the first diode when scanning towards the center of the light distribution, the drop in the waveform at this point may be incorrectly detected by the differentiator as a peak.

A further disadvantage of the differentiation technique is that only a small part of the light distribution, immediately adjacent to the peak, is used to activate the peak detection circuit. This limits the accuracy and repeatability of the peak determination.

Furthermore, one specific reason for the above-mentioned drop in amplitude in the waveform may be due to the non-uniform sensitivity of the photodiodes. That is, for the same given amount of light falling on the array, one or more photodiodes may produce different video output signals. This non-uniform sensitivity therefore can affect the accuracy of detecting the center of the light distribution as indicated above.

Also, the data processor of the prior patent application utilizes a large number of digital logic components including multivibrators, flip-flops, exclusive-OR gates, shift registers, counters and latches to obtain and store data identifying the position of the peaks at the detecting plane. This constitutes a complex circuit, at least in relation to the present invention.

Still furthermore, the lensmeter of this prior application can automatically adjust the intensity of the light source for the optical system if an insufficient amount of light is falling on the detecting plane. The processor detects the amount of light at the detecting plane and adjusts the light source to produce higher intensity light, if needed. Two disadvantages with this technique are that a relatively large amount of electrical power is needed to adjust the light source and the adjustment occurs relatively slowly.

DISCLOSURE OF THE INVENTION

It is an object of the present invention to provide a novel apparatus for determining a point of a distribution of light.

Another object of the present invention is to provide such an apparatus which maximizes the accuracy and repeatability of the determination of such a point.

It is another object of the present invention to provide a lensmeter which determines a specific point of the distribution of light to more reliably calculate the refractive properties of the test lens.

Yet another object of the present invention is to provide a lensmeter having a simplified digital logic circuit for producing data identifying the location of such a specific point.

Still another object of the present invention is to provide proper light intensity at the detecting plane, quickly and without consuming much electrical power.

The above and other objects of the present invention are provided by an apparatus for determining a point of a distribution of light at a detecting plane, including a scanning photodiode array having a plurality of photodiodes and being positionable at the detecting plane to sense the light, the photodiodes being adapted to generate video signals proportional to the sensed light, means for integrating the video signals over the range of the light distribution to generate an integral signal having amplitude, means for detecting a predetermined amplitude of the integral signal, and means for generating data representing the point of the light distribution in response to detecting the predetermined amplitude.

For the lensmeter of the present invention, the specific point that is detected is the median point of the distribution of the light.

BRIEF DESCRIPTION OF THE DRAWINGS

FIG. 1 is a schematic illustration of a lensmeter having an optical system and electronic data processor.

FIG. 2 illustrates light at a detecting plane of the lensmeter.

BEST MODE FOR CARRYING OUT THE INVENTION

Figure 3:
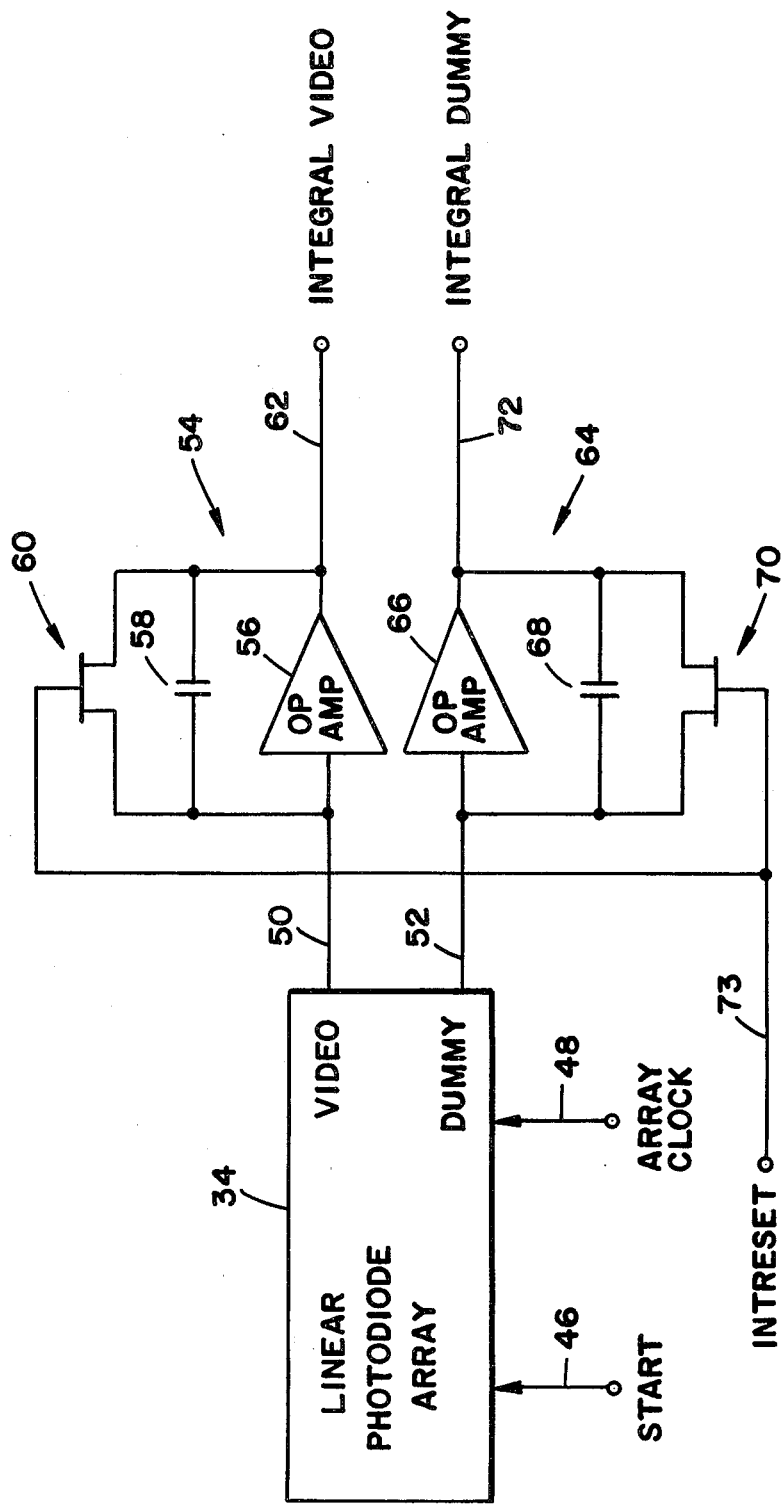
FIG. 3 is a schematic illustration of an analog circuit of the data processor of the present invention.

FIG. 1 shows generally a lensmeter 10 having an optical system 12 which is used to determine the refractive properties of a test lens 14. A light source 16 produces a divergent beam of light 17, a part of which illuminates one end of a light pipe 18, such as an optical fiber or fiber bundle. The other end of light pipe 18 constitutes a light source producing a divergent beam 19 which is filtered and collimated by optics 20 into a beam of collimated light rays 22. Light pipe 18 has a certain purpose which will be described below.

The test lens 14, whose refractive properties are to be determined, receives the rays 22 and produces refracted rays 24. Optics 26 then propagates the refracted rays 24 and produces re-refracted rays 27 which are transmitted through a circular annulus 28 of a mask 30 onto a detecting plane 32. A linear photodiode array 34 is positioned to detect the light falling on the plane 32.

As shown in FIG. 2, the pattern falling on the plane 32 formed by the re-refracted rays 27 and annulus 28 is generally an ellipse 36 having a shape, size and location with respect to the optical axis A of the lensmeter 10 that is dependent on the refractive properties of the test lens 14. For a much more detailed discussion of the optical system 12 and the manner in which the ellipse 36 is generated at the detecting plane 32, reference can be made to the above-mentioned co-pending application Ser. No. 085,864, filed Oct. 18, 1979 (now abandoned). This copending application is incorporated by reference in this application for all of its disclosure; however, it will become appreciated that such a detailed discussion is not required to understand the present invention.

FIG. 2 also shows the linear photodiode array 34 having a plurality of photodiodes 38, for example 1024, that can be scanned. The array 34 is centered on and rotatable about the central axis A, with one position of the array 34 being shown in FIG. 2. A number of photodiodes 38 intersect the ellipse 36 at area 40 and area 42 at which there are distributions of light. When the array 34 is scanned, a data processor 44 of the lensmeter 10 shown in FIG. 1 determines the location of the median point of the distribution of light in area 40 and area 42, respectively. These median points, being two points of the ellipse 36, are utilized to calculate the refractive properties of the test lens 14. By rotating the array 34 to another angular position, and scanning the array 34, the location of two more median points can be obtained from other photodiodes 38 that intersect the ellipse 36. Again, by rotating the array 34 to another angular position, and again scanning, the location of still two more median points can be obtained from still other photodiodes 38 that intersect the ellipse 36. The above-mentioned co-pending application describes in detail the manner in which six points of an ellipse such as ellipse 36 are used to calculate the refractive properties of the test lens 14. The six points which can be used in the calculation are the six median points mentioned just above.

FIGS. 3-6 show the data processor 44 in more detail. In FIG. 3, the linear photodiode array 34 receives a scanning start signal on an input line 46 and an array clock on an input line 48. In response to the start signal and array clock, each photodiode 38 is closed to produce a video signal on an output line 50, with the array 34 producing a dummy signal on an output line 52 for each video signal. An integrator 54 including an operational amplifier 56, a integrating capacitor 58, and a solid state switch such as a field effect transistor 60 integrates each video signal on line 50 from a corresponding photodiode 38 to produce an integral video signal on an output line 62. An integrator 64 including an operational amplifier 66, an integrating capacitor 68 and a solid state switch such as a field effect transistor 70 integrates the dummy signal on line 52 to produce an integral dummy signal on an output line 72. The transistor 60 and transistor 70 are gated on by an integrate reset pulse INTRESET received on a line 73 to discharge the capacitor 58 and capacitor 68.

In operation, when a start signal is received on line 46, the array 34 is scanned at the rate of the array clock on line 48. Each clock pulse on line 48 sequentially activates a photodiode 38 which produces a video signal on line 50, with the corresponding dummy signal being produced on line 52. At the leading edge of each clock pulse on line 48, a short integrate reset pulse INTRESET on line 73 is generated to gate on the transistor 60 and transistor 70. As a result, capacitor 58 and capacitor 68 are being fully discharged, and the video signal and dummy signal are not being integrated. Thereafter, when the pulse INTRESET on line 73 is not generated, integrator 54 and integrator 64 integrate the video signal and dummy signal via the charging of capacitor 58 and capacitor 68 to produce the integral video signal on line 62 and integral dummy signal on line 72. Thus, in the present example in which there are 1024 photodiodes 38, for one complete scan of the array 34, there are 1024 integral video signals and integral dummy signals being produced on line 62 and line 72.

Figure 4:
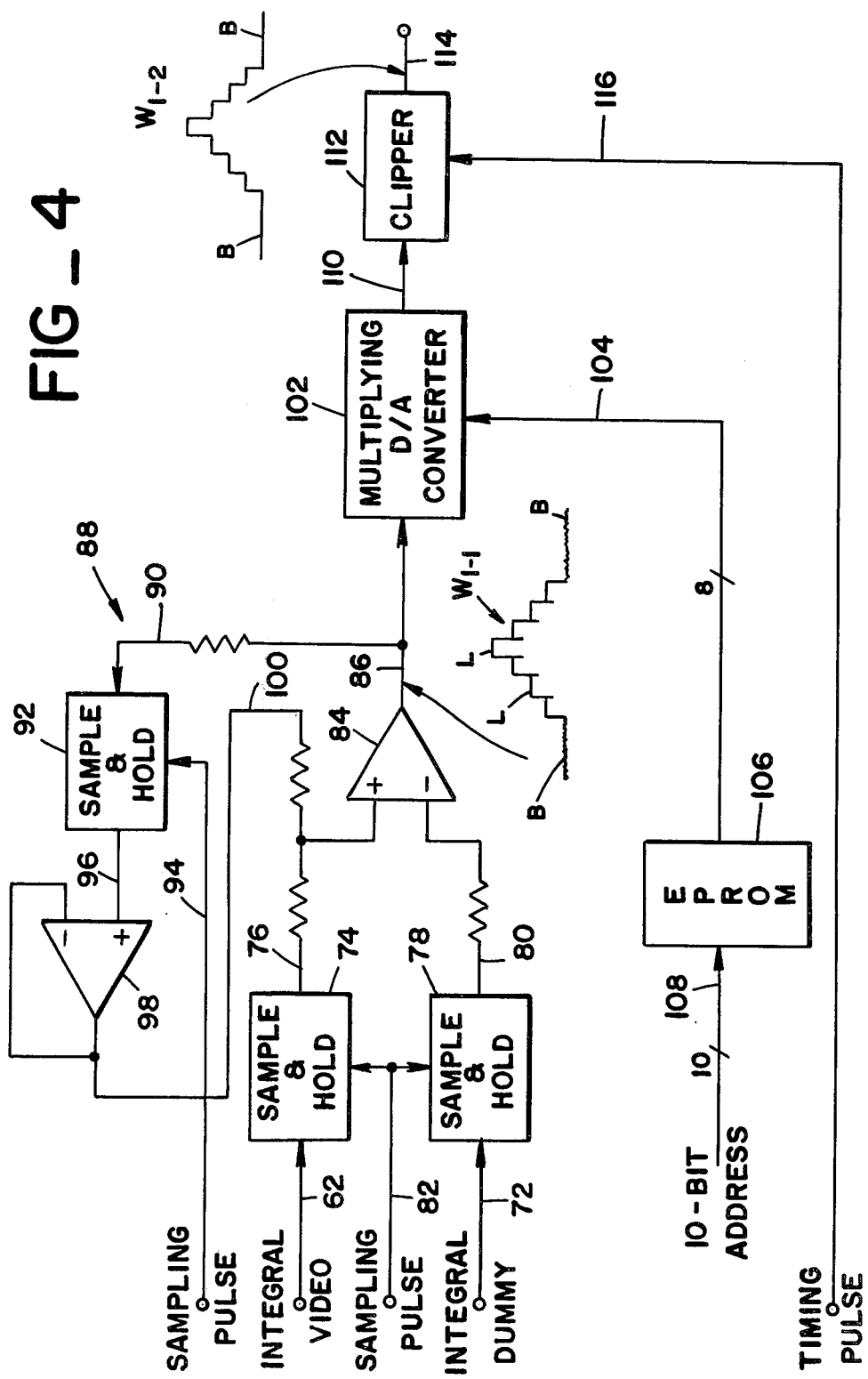
FIG. 4 is a schematic illustration of another analog circuit of the data processor of the present invention.

As shown in FIG. 4, each integral video signal on line 62 is fed to a sample and hold circuit 74, which produces a sample of each such video signal over an output line 76. Similarly, each integral dummy signal on line 72 is fed to a sample and hold circuit 78, which produces a sample of such dummy signal on an output line 80. A common sampling pulse is produced on a line 82 for the circuit 74 and circuit 78 to sample the signals on line 62 and line 72. A differential amplifier 84 takes the difference between each sampled integral video signal on line 76 and the corresponding sampled integral dummy signal on line 80 and produces an output differential signal on a line 86. The purpose of obtaining the differential signals by means of the amplifier 84 is to cancel out noise, such as might be produced from the array clock pulses on line 48, which will affect the video signals and dummy signals similarly.

FIG. 4 shows a waveform $W_{1-1}$ which is obtained at the output line 86 for the photodiodes 38 in the area 40 of the ellipse 36. The distribution of light of the ellipse 36 at the area 40 is such that higher voltage levels L of the waveform $W_{1-1}$ are produced by respective photodiodes 38 as the scanning occurs from one edge of the light distribution towards the center followed by decreasing voltage levels L produced by respective photodiodes 38 as the scanning continues towards the other edge of the light distribution. A similar waveform $W_{2-1}$ (not shown) is obtained at the time of scanning the array 34 where the area 42 of the ellipse 36 intersects the corresponding photodiodes 38.

An autozeroing DC feedback circuit 88 receives the output signal on line 86 over a line 90, including waveform $W_{1-1}$ and waveform $W_{2-1}$ (not shown). A sample and hold circuit 92 receives a sampling pulse on a line 94 to sample the output signal on line 90 at a time in the scanning before waveform $W_{1-1}$ appears to produce a sampled signal on an output line 96. An operational amplifier 98 amplifies the signal on line 96 to produce an output signal on a line 100 to bias the signal on line 76 for the following reason.

The voltage levels of the waveform $W_{1-1}$ or $W_{2-1}$ on the output line 76 may be an inaccurate representation of the amount of light falling on the array 34 due to, for example, commonly known factors such as drift or temperature changes of the circuit components. During the time before waveform $W_{1-1}$ appears, the voltage levels should be 0 since no light from the ellipse 36 is falling on the corresponding photodiodes 38. By taking a sample of the signal on line 86 at this time via the feedback network 88, a DC bias can be added to the video signals on line 76 via the line 100 to automatically reduce to zero any such DC voltage in the video signals.

In the remainder of this disclosure only the processing of waveform $W_{1-1}$ will be discussed in detail since waveform $W_{2-1}$ is similarly processed.

A multiplying digital to analog converter 102 has as one input the waveform $W_{1-1}$ on line 86 and another input over eight data lines 104 carrying an 8-bit data word from a memory 106 such as an erasable programmable read only memory or EPROM. A 10-bit address on ten lines 108 addresses the memory 106 to output prestored digital data on the lines 104 of the light sensitivity of each of the 1024 photodiodes 38.

The memory 106 and converter 102 are used to compensate for any non-uniform light sensitivity of the photodiodes 38. Prior to installing a particular array 34 in the lensmeter 10, this array 34 is illuminated with uniform light across all the photodiodes 38. If each photodiode 38 has equal light sensitivity, the output of all the photodiodes will be the same. However, due to non-uniform light sensitivity, one photodiode 38 may produce a higher output than another photodiode 38. The EPROM 106 is made to store 1024 digital data words identifying sensitivity factors corresponding, respectively, to each of the 1024 photodiodes 38. Thus, if the standard sensitivity factor is 1, the data word for a specific photodiode 38 will be higher, lower or equal to this sensitivity factor depending on the sensitivity of the specific photodiode 38.

In operation, as each photodiode 38 is clocked, the EPROM 106 receives a corresponding 10-bit address on lines 108 to output the data word on lines 104 identifying the sensitivity factor for that particular photodiode. The converter 102 converts this data word into an analog signal which is multiplied by the corresponding voltage of level L in waveform $W_{1-1}$ for that photodiode 38. Consequently, converter 102 produces the waveform $W_{1-1}$ on an output line 110, which is light sensitivity compensated.

A clipper 112 clips noise from the baseline B of the signal on line 110 such as to produce a zero volt baseline B on an output line 114. The clipper 112, in performing this function, also produces the waveform $W_{1-2}$ as shown corresponding to area 40, which does not have the zero voltage levels between levels L in waveform $W_{1-1}$. This is as a result of the limited high frequency response of the D/A converter 102 and clipper 112. The clipper 112 is controlled by a timing pulse being received on an input line 116 to clip the baseline B. As will become apparent, the purpose of clipper 112 is to more accurately integrate the waveform $W_{1-2}$ by not integrating any noise on the baseline B.

Figure 5:
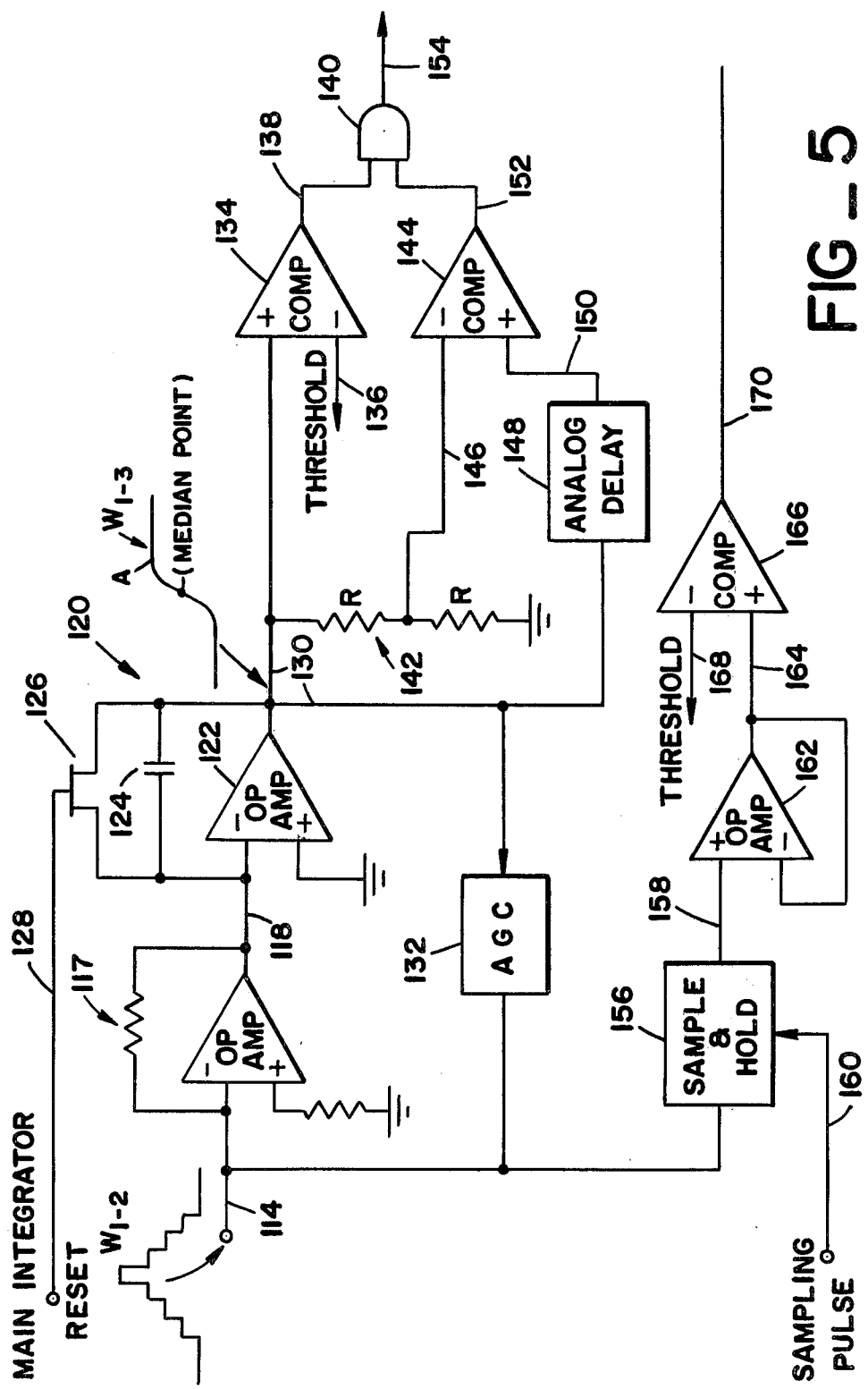
FIG. 5 illustrates schematically yet another analog circuit of the data processor of the present invention.

As shown in FIG. 5, the clipped waveform $W_{1-2}$ on line 114 is fed via an operational amplifier 117 and an output line 118 to a main integrator 120. This main integrator 120 includes an operational amplifier 122, an integrating capacitor 124 and a solid state switch 126, such as a field effect transistor, which is turned on by a main integrator reset pulse on a line 128.

At the start of the scanning of the array 34, the main integrator reset pulse on line 128 is generated to turn on the transistor 126 to discharge the capacitor 124 in anticipation of integrating the waveform $W_{1-2}$. Thereafter, as the waveform $W_{1-2}$ is received on line 118, main integrator 120 integrates this waveform $W_{1-2}$ over the entire range of the light distribution at area 40 to produce a main integral signal on an output line 130 as shown by the waveform $W_{1-3}$ building up to amplitude A. Thereafter, between waveform $W_{1-2}$ and waveform $W_{2-2}$, another main integrator reset pulse is generated on line 128 to turn on the transistor 126 and discharge the integrating capacitor 124 in anticipation of integrating the waveform $W_{2-2}$. This other main integrator reset pulse can be generated, for example, at the time of clocking photodiode number 512, which is about midway in the ellipse 36 where no light normally will be falling. The result is an integral signal or waveform $W_{2-3}$ similar to that shown for waveform $W_{1-3}$.

Also shown in FIG. 5 is an automatic gain control 132 which is coupled between the output line 130 of the integrator 120 and the input of the amplifier 117 on line 114 for gain control purposes.

A comparator 134 receives the main integral signal $W_{1-3}$ as one input on the line 130 and has a preset threshold as another input on an input line 136. The threshold is set at a value corresponding to the minimum light intensity of the ellipse 36 that must be present before a reading of the median point can be made by the lensmeter 10. If the amplitude of the integral signal $W_{1-3}$ is above the threshold on line 136, the comparator 134 produces an enabling signal on an output line 138 as one input to an AND gate 140.

A voltage divider 142 having two resistors R divides the amplitude of the integral signal $W_{1-3}$ by a predetermined value. For example, since the median point of the distribution of light is to be detected, this value is one-half and resistors R are of equal resistance. A comparator 144 has as one input on a line 146 the voltage signal of one half the amplitude of the integral signal $W_{1-3}$. An analog delay 148 delays the integral signal $W_{1-3}$ on the line 130 to produce a delayed main integral signal $W_{1-3}$ on an output line 150 as the other input to the comparator 144.

With the voltage signal on line 146 being at the mid-amplitude value of the integral signal $W_{1-3}$, when the delayed integral signal on line 150 rises to this mid-amplitude value, the output of the comparator 144 on a line 152 will go high. Consequently, with the signal on line 138 being high the gate 140 is enabled to produce a detect pulse on an output line 154. The leading edge of this detect pulse on line 154 corresponds to the median point of the distribution of light in the area 40 of the ellipse 36. The main integral signal $W_{2-3}$ is processed in the same manner to produce another detect pulse on line 154 whose leading edge represents the median point of the distribution of light at the area 42 of the ellipse 36.

The clipped waveform $W_{1-2}$ on line 114 is also fed to a sample and hold circuit 156 which produces a sample of this waveform on an output line 158 in response to a sampling pulse being received on a line 160. This sampled signal on line 158 is fed through an operational amplifier 162 onto a line 164 as one input to a comparator 166. The other input to the comparator 166 is a preset threshold on a line 168. If the signal on line 164 is lower than the threshold on line 168, the comparator 166 produces a low level light pulse of logic 0 on an output line 170. If the signal on line 164 is higher than the threshold on line 168, then a low level light pulse of logic 1 is produced on line 170.

The purpose of the pulse on line 170 is to provide information concerning the type of test lens 14 being tested. If, for example, for a given light intensity from a source 16 the test lenses 14 being tested are sunglasses, then the level of light falling on the detecting plane 32 will be low in relation to the level of light falling on the plane 32 if these test lenses 14 are clear. The pulse on line 170 is used to compensate for the low light level when testing sunglasses as will be described in connection with FIG. 6.

Figure 6:
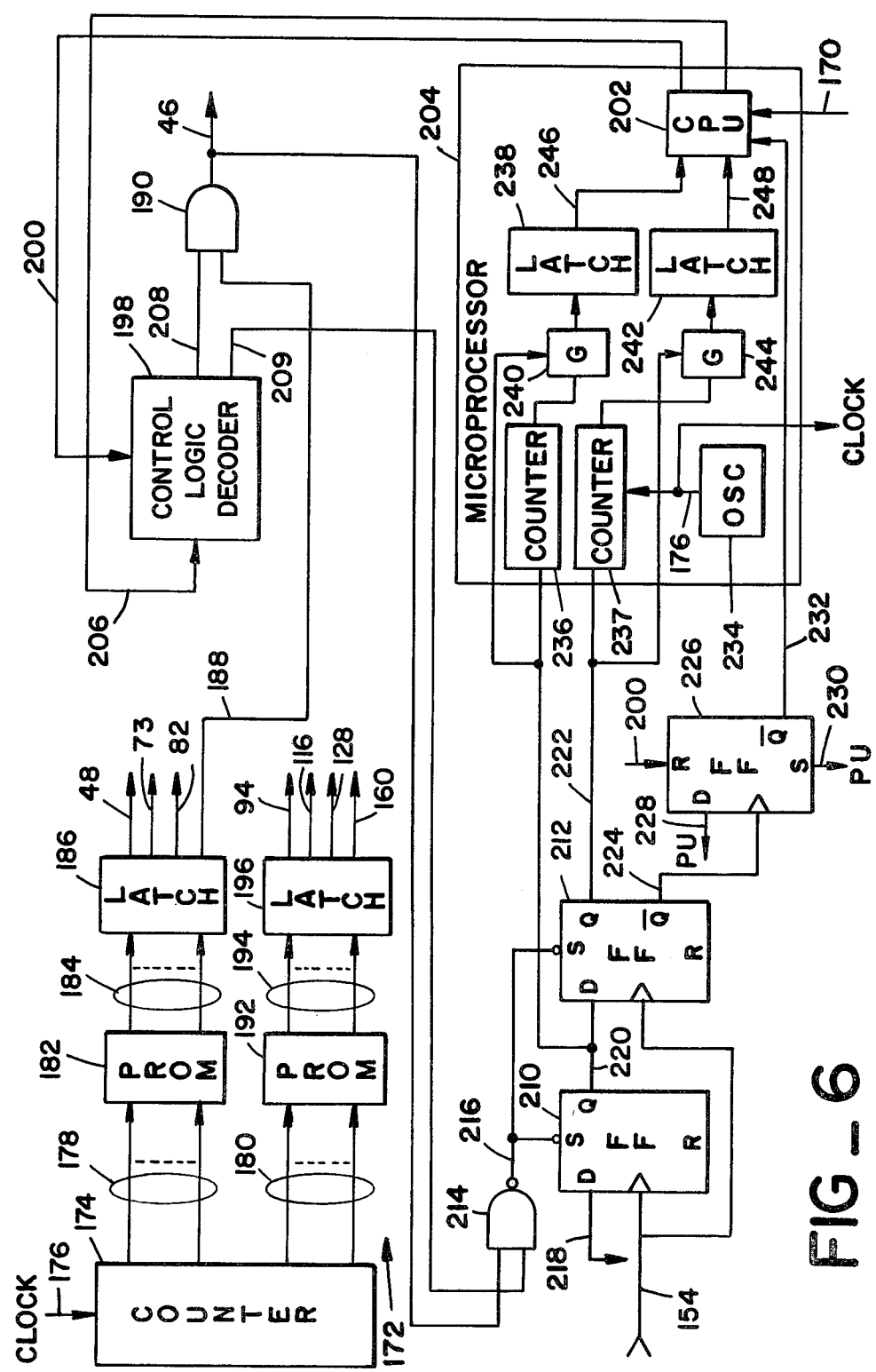
FIG. 6 illustrates a digital logic circuit of the data processor of the present invention.

FIG. 6 illustrates a logic circuit 172 for generating timing, median point data and other signals. A 16 bit counter 174 counts system clock pulses being received on a line 176 to produce address signals on lines shown generally at 178 and address signals on lines shown generally at 180. A programmable read only memory or PROM 182 is addressed by the address signals on lines 178 to output timing signals over lines shown generally at 184. A latch 186, which functions to buffer out noise from the timing signals being received on lines 184, outputs these timing signals as the array clock on line 48 for the photodiode array 34, which is slower than the system clock on line 176 for reasons to be described, the integration reset pulse on line 73 for the integrator 54 and integrator 64, and the sample pulse on line 82 for the sample and hold circuit 74 and sample and hold circuit 78. Latch 186 also produces a pulse on a line 188 which is gated through an AND gate 190 in a manner to be described below to become the start signal on line 46 for the photodiode array 34.

A programmable read only memory or PROM 192 receives the address signals on line 180 to produce timing signals on lines shown generally at 194. A latch 196, which functions to buffer out noise from the signals on lines 194, produces the sampling pulse on line 94 for the automatic zeroing feedback circuit 88, the timing pulse on line 116 for clipper 112, the main integration reset pulse on line 128 for the main integrator 120 and the sampling pulse on line 160 for sample and hold circuit 156.

A control logic decoder 198 receives a data request pulse on a line 200 from a central processing unit or CPU 202 of a microprocessor 204 and a control pulse on a line 206 from the CPU 202. Control logic decoder 198 decodes the pulses on line 200 and line 206 to produce a photodiode array start inhibit pulse of variable duration on an output line 208 which is coupled as the other input to the gate 190. The CPU 202 produces the pulse on line 206 in response to the light level pulse on line 170 from the comparator 166. The CPU 202 produces the data request pulse on line 200 in response to depressing a read button (not shown) on the lensmeter 10 to take a reading of the refractive properties of the test lens 14. Control logic decoder 198 also produces a pulse on an output line 209, in response to the pulses on line 200 and line 206, which pulse is high only when taking such a reading.

A D-type flip-flop 210 and a D-type flip-flop 212 have set inputs coupled to the output of a NAND gate 214 over a line 216. Gate 214 has one input connected to the line 146 from gate 190 and another input connected to the line 209. Flip-flop 210 has its D-input connected to ground over a line 218 and an output Q coupled over a line 220 to the D-input of the flip-flop 212, the latter having an output Q produced on a line 222 and an output $\overline{Q}$ produced on a line 224. Flip-flop 210 and flip-flop 212 are clocked by the detect pulses being received on the line 154 from the gate 140.

A data available D-type flip-flop 226 has a clock input coupled to the line 224, a data input coupled to a pull-up resistor over a line 228, a set input coupled to a pull-up resistor on a line 230 and a reset input coupled to the line 200 receiving the data request pulse from CPU 202. Flip-flop 226 produces an output $\overline{Q}$ over a line 232.

Microprocessor 204 also includes an oscillator 234 which produces the system clock on the line 176, and two 16-bit counters 236 and 237 which count down at the rate of the system clock on line 176. A latch 238 stores the count in counter 236 via a gate 240 which is enabled by the output Q on line 220 from the flip-flop 210, this output Q also first causing the counter 236 to stop counting. A latch 242 stores the count in the counter 237 via a gate 244 which is enabled by the output Q on line 222 from the flip-flop 212, this output Q also first causing the counter 237 to stop counting. The CPU receives the data stored in latch 238 and latch 242 over respective lines 246 and 248 to calculate the refractive properties of the test lens 14 as will be further described. CPU 202 receives the output Q on line 232 from the flip-flop 226, indicating that data is available in latch 238 and latch 242.

In the operation of circuit 172, as the counter 174 counts the clock on line 176, signals will be produced on lines 178 to address PROM 182. At each address location, PROM 182 produces an output signal on one of the lines 184 ultimately resulting in the signals on line 48, line 73, line 82 and line 188 being produced to perform the described functions. Similarly, as the count in counter 176 continues, PROM 192 will be addressed by the address signals on line 180, ultimately resulting in the timing signals on line 94, line 116, line 128 and line 160 being produced. For example, as already mentioned, the main integrator reset pulse on line 128 is produced twice during one scan, once at the start of the scan and the second midway during the scan to reset the integrator 120 for waveform $W_{1-2}$ and waveform $W_{2-2}$.

When the signal on line 170 is high, indicating that adequate light intensity is present at the detecting plane 32, CPU 202 produces a pulse of one level on line 206 which, together with the data request pulse on line 200, are decoded by decoder 198 to produce the start inhibit pulse of shorter duration on line 208. When the signal on line 170 is low, indicating an inadequate light intensity at plane 32, CPU 202 produces a pulse of another level on line 206 which, together with the data request pulse on line 200, are decoded by decoder 198 to produce the start inhibit pulse of longer duration on line 208. Thus, subsequent to generating the data request pulse on line 200, gate 190 is disabled for the duration of the inhibit pulse to prevent the start signal on line 46 from being generated, thereby preventing scanning of the array 34. The period between the data request pulse and the start pulse is a light integration period during which the amount or level of light falling on the array 34 builds up before a reading is taken. For low light levels, this integration period is the longer period, while for adequate light levels it is the shorter period. After the disabling period produced by the inhibit pulse on line 208, gate 190 is enabled to gate the pulse on line 188 to the line 46 to start the scanning of the array 34.

At the start of and during the taking of a reading, i.e., once the data request pulse on line 200 is produced, decoder 198 produces the high pulse on line 209, which together with the start signal on line 46, enables gate 214 to set the flip-flop 210 and flip-flop 212. Thereafter, when the first detect pulse for one scan is produced on line 154, flip-flop 210 is clocked to produce a logic 0 at output Q on line 220 which is fed to the data input of flip-flop 212 and which enables the gate 240. At this time, the count in counter 236 will be gated through gate 240 and stored in latch 238. Then, when the next detect pulse on line 154 is produced for this scan, flip-flop 212 is clocked to produce a logic 0 at output $\overline{Q}$ on line 222 which enables the gate 244 to store the count in counter 237 in latch 242. Also, when flip-flop 212 is clocked by this next detect pulse, the output Q on line 224 goes high to clock the flip-flop 226. This produces a logic 0 on line 232 which informs the CPU 202 that data is available in latch 238 and latch 242. Thereafter, the CPU 202 can access this data to perform the calculations of the refractive properties of the test lens 14 as described in the above mentioned co-pending patent application.

In the overall operation of the lensmeter 10, assume that a test lens 14 is in the operative position shown in FIG. 1 and that the power supply (not shown) for the lensmeter 10 has been turned on. The light source 16 will be on so that the ellipse 36 will be produced at the detecting plane 32. Also assume that the test lens 14 is a clear spectacle, i.e., not for example a sunglass, so that the amount of light falling on the plane 32 is relatively high.

When the power supply is turned on, the data processor 44 will be in a free-running or idle mode. That is, oscillator 234 produces the clock on line 176, resulting in counter 174 cycling through its count. Also control logic decoder produces a high pulse on line 208 to enable gate 190, whose output is the start signal on line 46, and this results in array 34 scanning the ellipse 36 in one rotatable position such as the position shown. The various waveforms $W_{1\text{-}1}\text{-}W_{1\text{-}3}$ and $W_{2\text{-}1}\text{-}W_{2\text{-}3}$ are generated; however, until the above-mentioned read button (not shown) is depressed, the decoder 198 produces a low pulse on line 209 to disable gate 214 so that flip-flops 210 and 212 remain reset. Consequently, no reading of the median points of the light distribution can be taken.

Assume now that the read button is depressed and that the light falling on the detecting plane 32 is above the threshold set in the comparator 166 so that a high light level signal is produced on line 170. The CPU 202 then produces the data request signal on line 200 and the signal on line 206. Control logic decoder 198 then produces the array start inhibit signal on line 208 of the shorter predetermined duration or integration period, during which gate 190 is disabled and gate 214 is disabled. Consequently, the start signal on line 46 is not generated and the flip-flops 210 and 212 continue to be reset. Therefore, at this time, the amount of the light falling on the detecting plane is allowed to build up.

At the end of this integration period, the start inhibit signal on line 208 goes high to enable gate 190. Then, when the signal on line 188 is generated, this is gated through gate 190 as the start signal on line 46 to commence the scanning. Simultaneously, gate 214 is enabled to set the flip-flop 210 and the flip-flop 212, since the pulse on line 209 already went high when the data request pulse on line 200 was produced. Also, while not shown, counters 236 and 237 are reset to begin counting down from their highest counts at the rate of the clock on line 176.

As the scanning by the array 34 occurs, the waveforms $W_{1\text{-}1}\text{-}W_{1\text{-}3}$ are developed as already described. Ultimately, the first detect pulse on line 154 is generated to clock the flip-flop 210. The count in counter 236 at this instant is gated into latch 238, which now stores data of the median point of the distribution of light in area 40.

Thereafter, as the scanning by array 34 continues, waveforms $W_{2\text{-}1}\text{-}W_{2\text{-}3}$ are produced, as already described. Ultimately, the second detect pulse on line 154 is generated to clock flip-flop 212. The count in counter 237 at this instant is gated into latch 238, which now stores data of the median point of the distribution of light in area 40.

Thereafter, as the scanning by array 34 continues, waveforms $W_{2\text{-}1}\text{-}W_{2\text{-}3}$ are produced, as already described. Ultimately, the second detect pulse on line 154 is generated to clock flip-flop 212. The count in counter 237 at this instant is gated into latch 242, which now stores data of the median point of the distribution of light in area 42. Flip-flop 226 also is clocked by the output $\overline{Q}$ of flip-flop 212 to inform the CPU 202 via the signal on line 232 that is available in the latch 238 and latch 242. Thereafter, the CPU 202 can receive this data in anticipation of performing the calculations of the refractive properties of the test lens 14.

Assume now that the test lens 14 is a sunglass, such that the amount of light falling on the detecting plane 32 is less than the threshold on line 168 of the comparator 166 at the time the read button is depressed, resulting in a low light level pulse on line 170. Control logic decoder 198 will thereby produce an array start inhibit signal on line 208 that is of longer duration, for example, three times as long as the shorter inhibit signal, to disable gate 190. Consequently, a longer integration period is produced, during which more light will be allowed to build up on the detecting plane 32 before an array scan is started. At the end of this longer integration period, the scanning occurs, as described above to produce data in latch 238 and latch 242.

Reference can be made to the above-mentioned co-pending patent application for a detailed understanding of the manner in which a microprocessor such as microprocessor 204 can calculate the refractive properties. For example, as taught in such patent application, after data is obtained in latch 238 and latch 242 of the present invention, the array 34 shown herein in FIGS. 1–2 can be rotated to at least two other positions to obtain data of four other median points of the light distribution of ellipse 36.

The reason for using the light pipe 18 is the following. When test lenses of differing refractive properties, particularly prismatic power, are being measured, the light arriving at the detecting plane 32 emerges from the light source 16 at different angles. Consequently, if the light distribution emerging from source 16 is not identical as seen from different viewing angles, the shape of the ellipse 36 can be affected, which also affects the calculations.

When a standard filament lamp such as source 16 is used without the light pipe 18, the emerging light distribution will vary with viewing angle because the filament of the lamp is extended in three dimensions. For example, at some viewing angles, some parts of the filament shadow other parts that might not be equally as bright. By using the light pipe 18, the end of this pipe 18 from which rays 19 emerge acts as a light source. So long as the ratio of length to width of the pipe 18 is large, e.g. greater than 50:1, the light distribution emerging from pipe 18 will effectively be identical for all viewing angles that occur over the range of prism powers of test lenses that are being measured.

Furthermore, while in the above-mentioned prior application the mask 30 is disposed between test lens 14 and optics 26, in the present invention the mask 30 is disposed between optics 26 and detecting plane 32. This is because it has been found that this latter positioning of mask 30 results in substantially less "ghost" images of the ellipse 36 appearing at the plane 32.

By integrating the video signal from array 34 to detect median points, more reliable data is obtained to calculate the refractive properties than if peak points were detected. That is, the median is less perturbed by, for example, electrical noise or variations in photodiode sensitivity, than is the detection of the peak. In integrating each video output from a given photodiode via integrator 54, and then integrating these video outputs over the entire range of the light distribution via integrator 120, more signal averaging occurs, which, for example, averages out noise that can affect the measurements. Thus, a more reliable estimate of the location of the ellipse 36 is obtained, which produces better results.

Also, more accurate measurements of the location of the median points of the light distribution in area 40 and area 42 on the array 38 are obtained by clocking counter 236 and counter 237 at a higher rate than the array clock on line 48. The clock rate on line 176 for counter 236 and counter 237 is set at exactly 16 times the array clock rate on line 48. This results in a limit of resolution equivalent spacially to one-sixteenth of the width of one photodiode 38. This is a sixteen fold improvement in accuracy and resolution over setting the clock rate on line 176 equal to the array clock on line 48.

More accurate measurements are also obtained by compensating for the non-uniform sensitivity of the photodiodes 38. Also, as can be seen in FIG. 6, a relatively small number of digital logic components are required to obtain the data used by the microprocessor 204 to make the calculations. Furthermore, the correct amount of light is provided at the detecting plane 32 quickly and without much power, for sunglasses or clear glasses which are being tested, by varying the integration period or duration of the array start inhibit signal on line 208.

Other aspects, objects and advantages of this invention can be obtained from a study of the drawings, the disclosure and the appended claims.

We claim:

1. Apparatus for determining the location of a point in a distribution of light at a detecting plane, comprising:
   (a) a scanning photodiode array having a plurality of photodiodes and being positionable at the detecting plane to sense the light, said photodiodes being adapted to generate video signals proportional to the sensed light;
   (b) means for integrating the video signals over the range of the light distribution to generate an integral signal having amplitude;
   (c) means for detecting a predetermined amplitude of the integral signal to produce a detect signal; and
   (d) means, responsive to the detect signal, for generating data representing the location of said point in the light distribution.

2. Apparatus according to claim 1 wherein each of said photodiodes is adapted to generate one of the video signals proportional to the sensed light.

3. Apparatus according to claim 2 wherein said means for integrating comprises:
   (a) first means for integrating each of the video signals generated by each of said photodiodes; and
   (b) second means, connected to said first integrating means, for integrating the integrated video signals to produce the integral signal.

4. Apparatus according to claim 3 wherein said means for detecting comprises:
   (a) means for dividing the integral signal to produce the predetermined amplitude;
   (b) means for delaying the integral signal; and
   (c) means for comparing the divided integral signal with the delayed integral signal.

5. Apparatus according to claim 2 further comprising:
   (a) means for generating a photodiode compensation signal for each of said photodiodes; and
   (b) means for compensating each of the video signals with the corresponding photodiode compensation signal.

6. Apparatus according to claim 5 wherein said means for generating a photodiode compensation signal comprises a memory having prestored photodiode compensation data for each of said photodiodes.

7. Apparatus according to claim 6 wherein said means for compensating comprises a signal multiplying circuit for multiplying each of the video signals with the corresponding photodiode compensation signal.

8. Apparatus according to claim 1 further comprising:
   (a) means for starting the scanning of said photodiode array;
   (b) means for detecting the level of light at the detecting plane to produce a light level signal; and
   (c) means, responsive to the light level signal for controlling said starting means to vary the starting of the array scanning.

9. A lensmeter for determining the refractive properties of a test lens, comprising:
   (a) optical means for producing an elliptical pattern of light at a detecting plane, the elliptical pattern having information of the refractive properties of the test lens;
   (b) a scanning linear photodiode array having a plurality of light sensitive photodiodes and being disposed at the detecting plane to intersect the elliptical pattern of light and to sense the light, said photodiodes being adapted to generate video signals proportional to the sensed light;

(c) first means for integrating each of the video signals to produce first integral video signals;

(d) means for compensating the first integral video signals for the light sensitivity of said photodiodes to produce compensated first integral video signals;

(e) second means for integrating the compensated first integral video signals to produce first and second main integral signals each corresponding to a distribution of light of the elliptical pattern;

(f) means, responsive to the first and second main integral signals, for detecting the location of the median point of each distribution of light and for generating first and second median point detect signals, respectively; and (g) means, responsive to the first and second median point detect signals, for generating data identifying the location of the median point of each distribution of light.

10. A lensmeter according to claim 9 wherein said first means for integrating comprises a resettable integrator connected to said linear photodiode array.

11. A lensmeter according to claim 10 further comprising:

(a) sample and hold means, connected to said resettable integrator, for sampling the first integral video signals; and (b) automatic zeroing means for eliminating unwanted DC voltages from the sampled integral video signals.

12. A lensmeter according to claim 9 wherein said means for compensating comprises:

(a) a read only memory having prestored data representing the light sensitivity of each of said photodiodes; and (b) means for multiplying the first integral video signals by the corresponding prestored data, respectively.

13. A lensmeter according to claim 9 wherein said second means for integrating comprises a resettable integrator, the first and second main integral signals having amplitude.

14. A lensmeter according to claim 13 wherein said means for detecting comprises:

(a) a voltage divider, connected to said resettable integrator, for dividing the amplitude of the first and second main integral signals in half;

(b) a delay, connected to said resettable integrator, for delaying the first and second main integral signals; and (c) a comparator, connected to said voltage divider and said delay, for comparing the divided first and second main integral signals with the delayed first and second main integral signals, respectively.

15. A lensmeter according to claim 9 wherein said means for generating data comprises:

(a) first flip-flop means, responsive to the first median point detect signal, for generating a first gating signal;

(b) second flip-flop means, responsive to the second median point detect signal, for generating a second gating signal.

(c) a system clock for generating clock pulses;

(d) a counter for counting the clock pulses; and (e) means, responsive to the first and second gating signals, for storing the count of said counter.

16. A lensmeter according to claim 9 further comprising:

(a) means for starting the scanning of said photodiode array;

(b) means for detecting the level of light at the detecting plane to produce a light level signal; and (c) means, responsive to the light level signal, for controlling said starting means to vary the starting of the array scanning.

17. A lensmeter according to claim 9 wherein said optical means comprises:

(a) a filament-type lamp; and (b) a light pipe positioned to receive light from said lamp and positioned to be the light source for the test lens.

18. A lensmeter according to claim 17 wherein said light pipe has a length to width ratio of approximately greater than 50:1.

19. A lensmeter according to claim 9 wherein said optical means comprises:

(a) optics for re-refracting light from the test lens; and (b) a light mask having a circular annulus for transmitting the re-refracted rays and positioned between said optics and said photodiode array.

* * * * *